United States Patent Office 3,326,854
Patented June 20, 1967

3,326,854
HIGH TEMPERATURE-RESISTANT POLY-
CARBONATES AND PROCESS
Winston J. Jackson, Jr., and John R. Caldwell, Kingsport,
Tenn., assignors to Eastman Kodak Company, Rochester, N.Y., a corporation of New Jersey
No Drawing. Filed Feb. 6, 1964, Ser. No. 343,129
23 Claims. (Cl. 260—47)

This invention relates to polymers which distort only at relatively high temperatures, and particularly concerns formed articles of polycarbonates, such as films, fibers, coatings, and the like, exhibiting this improved resistance to heat distortion, and further concerns the preparation of these articles.

A major problem which confronts the synthetic plastics industry is the thermally induced change in dimensions and shapes of plastic articles, particularly fibers and photographic film base and the like which of necessity must not deform more than a very slight amount under heat if, for example, it is to properly fit with close tolerance and operate in heated processing equipment, motion-picture apparatus, and the like. The problem of heat distortion is particularly significant in the case of films of polycarbonates prepared from some aromatic dihydroxy compounds. Some of these polymers have heat-distortion temperatures as low as about 150° C., which temperature can foreseeably be attained even through inadvertence in certain instances.

Where polycarbonate films are cast from volatile solvents such as methylene chloride, ethylene, dichloride, chloroform, benzene, or toluene, strains are produced in the films as the solvent evaporates. When the heat-distortion temperature of the film is determined while the film is under a light load, such as 5 p.s.i., distortion occurs due to shrinkage of the film; when the load is 50 p.s.i., distortion is usually due to extension of the film. The heat-distortion temperature is the temperature at which 2% distortion (shrinkage or extension) occurs. The total shrinkage when the film is heated at 5 p.s.i. is often 5–10%. If the film is preshrunk, then shrinkage will not occur at 5 p.s.i. and the film can be heated 25–50° C. higher before 2% distortion occurs. The distortion at this higher temperature is due to film extension. The equipment in which these heat-distortion temperatures are measured is described in Modern Plastics, 34 (No. 3), 169 (1956).

Objects of the present invention, therefore, are: to provide a means to improve the resistance of polycarbonates to deformation under the influence of heat; to provide polycarbonates in the form of films and other ordinarily easily distortable shapes, but having greatly improved resistance to heat distortion; and to render aromatic diol polycarbonates useful for a variety of applications including electrical insulation in general and specifically capacitor dielectric material which would alter the electrical characteristics of the capacitor if heat deformed more than a small amount.

These and other objects hereinafter becoming apparent have been achieved in accordance with the present invention through the discovery that homo- or copolymers of aromatic diols, and copolymers thereof with aliphatic, cycloaliphatic, or alicyclic diols, and particularly films and fibers of these materials, when heat-treated (preshrunk) in a certain manner hereinafter disclosed, become substantially more resistant to distortion by heat.

The polycarbonates of the present invention are those prepared by the reaction of one or more aromatic diols and either phosgene or a bischloroformate. The useful aromatic diols are those, for example, in which the hydroxy functions are on either the same aromatic ring as in hydroquinone and 5,6,7,8-tetrahydro-1,4-napthalenediol, on different fused aromatic rings as in 2,5-naphthalenediol, or on different aromatic rings connected by various aliphatic, alicyclic, or aromatic radicals. Representative diols within these classes are: 4,4'-isopropylidenediphenol; 4,4'-ethylidenediphenol; 4,4'-(4-chloro-α-methylbenzylidene)diphenol; 4,4'-cyclohexylidenediphenol; and 4,4' - (cyclohexylmethylene)-diphenol, respectively. See U.S. Patents 2,883,365 and 2,894,004 for a more comprehensive disclosure of such bisphenols. It is noted the halogen derivatives of the aromatic diols, for example, 4,4'-isopropylidenebis(2,6-dibromophenol) may also be employed.

Useful bisphenols also include the "gem-bisphenols" in which the two phenol or substituted phenol groups are attached to a single carbon atom of the bivalent connecting radical. Such bisphenols have the general formula:

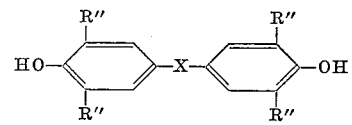

wherein R'' is hydrogen, halogen, or alkyl groups ($C_1$ to $C_4$) and X represents a saturated gem-bivalent connecting radical containing a saturated polycyclic structure which includes a bicyclic member containing at least one atomic bridge.

Typical of some three-dimensional polycyclic structures is the norbornane ring. The conventional method of drawing this ring is as follows:

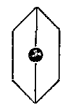

An appropriate representation which shows the three-dimensional nature of the ring is as follows:

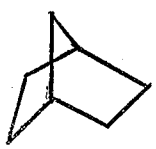

Within the gem-bivalent connecting radical, the single carbon atom to which the two phenol nuclei of the bisphenol are connected may be a carbon within the polycyclic structure, or it may be a —CH< group attached to the polycyclic structure. In 4,4'-(2-norbornylidene)diphenol, the phenolic groups are attached directly to a carbon atom within the polycyclic structure:

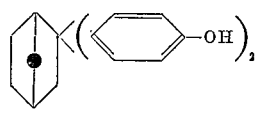

In 4,4'-(2-norbonylmethylene)diphenol, a methylidyne group attached to the polycyclic structure carries the phenolic groups:

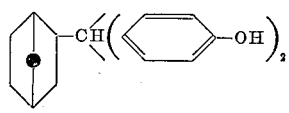

There may be additional saturated rings in the polycyclic structure in addition to the bicyclic member which contains the atomic bridge. These may be joined by fused or spiro-union linkage in the polycyclic structure. Atomic bridges may also occur in the additional member rings of the polycyclic structure. There may be alkyl, halogen, or aromatic substituents in the connecting radical.

The atomic bridge within the polycyclic structure may have more than one carbon atom, e.g., (bicyclo[2.2.2]octane)

There may be more than one bridge in the polycyclic structure: e.g., (tricyclo[2.2.1.0$^{2,6}$]heptane)

(adamantane)

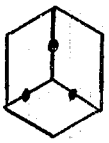

The atomic bridge may consist of an oxygen or nitrogen atom instead of carbon: e.g., (7-oxabicyclo[2.2.1]heptane)

There may be alkyl, aryl and halide substituents on the polycyclic structure: e.g., (substituted norbornane)

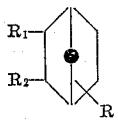

R, R$_1$, and R$_2$=H, halogen, alkyl (C$_1$–C$_4$), and aryl. Also, two substitutents may be attached to the same carbon atom. Of course all of these substituents must be in positions which do not interfere with formation of the bisphenol. Because of steric effects, certain bisphenols cannot be obtained, e.g., those from some norbornane derivatives with two alkyl or halogen substituents in the 3 or 7 positions.

Additional saturated rings may be fused to the bicyclic bridged ring member in the polycyclic structure. These may be hydrocarbon or heterocyclic rings, e.g., (hexahydro-4,7-methanoindane)

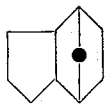

(octahydro-4,7-methanoisobenzofurane)

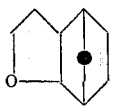

There may be additional bridges in the fused rings, e.g., (decahydro-1,4,5,8-dimethanonaphthalene)

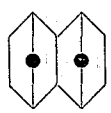

(dodecahydro - 4,9,5,8 - dimethano - 1 - cyclopenta(b)naphthalene)

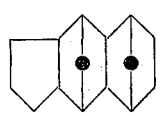

Additional saturated rings may be joined in the polycyclic structure by spiro-union linkage, e.g., (spiro[cyclopropane-1,7′-norbornane])

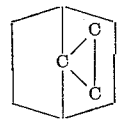

Linear polycarbonates can be prepared by condensation of phosgene or a bischloroformate of a diol, or a mixture of these, with one or more diols, including those disclosed in U.S. Patent 3,030,335, and including the novel three-dimensional polycyclic bisphenols. It will be apparent that the polycarbonates formed by condensing either phosgene or diol bischloroformates with the same or different diols, can be described as consisting essentially of recurring residues of carbonic acid and the diols. By condensing the bischloroformate of one diol with another diol, homogeneous polycarbonates having regularly recurring residues will be obtained, whereas copolycarbonates will be obtained having randomly recurring residues when a mixture of diols are condensed with phosgene. A comprehensive disclosure of the preparation of the above gem-bisphenols may be found in applicants' copending U.S. application Ser. No. 292,139.

The diol from which the bischloroformate is prepared may be aromatic, aliphatic, or alicyclic, and may be primary, secondary, or tertiary. The carbon chain of aliphatic diols may be straight, or branched and may contain from 2 to 20 carbon atoms. Examples of diols are ethylene glycol; 1,6-hexanediol; 1,4-hexanediol; 1,4-cyclohexanedimethanol; p-xylylenediol; 2,5-norbornanediol; trans-1,4-cyclohexanediol; 2,5 - dimethyl-2,5-hexanediol; hydroquinone; and 4,4′-isopropylidenediphenol. Also any of the following groups may be present in the molecule (R=alkyl or aryl): —R$_2$C—, —O—, —OCH$_2$CH$_2$O—, —S—, —SO—, —SO$_2$—, —SO$_2$NR—, —NR—, —CONH—, —CO—, —COO—, CF$_2$, —NRNR—, —CH=CH—, —C≡C—, phenylene, cyclohexylene, etc.

Bischloroformates of aliphatic and alicyclic diols may be prepared by adding an excess of phosgene to the diol suspended in ethylene dichloride. If the diol reacts very slowly, some dry dioxane is also added to increase its solubility in the medium. After all of the diol has been dissolved, dry air is passed in until all of the hydrogen chloride and excess phosgene has been swept out. The bischloroformate solution may then be used as needed in the polymerization reactions.

Bischloroformates of aromatic diols, including bisphenols, may be prepared by simultaneously adding the diol (dissolved in dioxane) and dimethylaniline to a stirred solution of phosgene in toluene. A similar procedure is described in British Patent No. 613,280.

When a bischloroformate is added to the reaction mixture, the molar amount of the bisphenol preferably should be equal or in slight excess (5 mole percent). When phosgene and a bischloroformate are both added, or the phosgene alone is used, the phosgene preferably should be 5 to 10 mole percent in excess of its equivalent bisphenol in the reaction mixture.

A particularly useful group of polycarbonates are those prepared from at least 50 mole percent of at least one diol selected from the group consisting of 4,4′-isopropylidenediphenol, 4,4′ - (2 - norbornylidene)diphenol, 4,4′-(2-norbornylmethylene)diphenol, 4,4′ - (hexahydro-4,7-methanoindan - 5 - ylidene)diphenol, 4,4′-isopropylidenebis(2,6 - dibromophenol), and 5,6,7,8 - tetrahydro-1,4-naphthalenediol.

It is noted that innumerable variations of useful polycarbonates may be prepared by employing a diol component preferably less than 50 mole percent of which is comprised of various non-aromatic diols such as the aliphatics and alicyclics, and/or various bischloroformates. Moreover, these polymers may contain a wide variety of plasticizers, antiplasticizers, fillers, pigments, and the like required for certain specific applications. It is noted that it is the present inventive heat treatment which elevates the heat-distortion temperature of all of these polymers and thereby greatly broadens their utility.

Heat treatment of the films

The second-order transition temperatures of the present noncrystalline polymers are the temperatures at which the polymer chains begin to move measurably. The second-order transition temperatures of such polymers were taken as the temperatures at which the films distorted (shrank) ¼ percent under a load of 5 p.s.i. when heated in a forced convection oven as described in Modern Plastics, 34 (No. 3), 169 (1956), and ASTM D1637–61. It is noted that the ¼ percent distortion results from the early stage loosening up of the polymer chains. It is therefore necessary to carry out the preshrinking treatment at a temperature at or preferably somewhat above the second-order transition temperature. To prevent the film from buckling during this operation, it should preferably be under a slight tension (load). Normally, about 1–5 p.s.i is sufficient for this purpose. The time that a film should be heated depends upon how far the temperature is above the second-order transition temperature. If the temperature is just a few degrees above the second-order transition temperature, one hour may be required. The most rapid procedure is to heat the film directly to the temperature (previously determined) at which maximum shrinkage occurs and to hold it at this temperature for about one minute. If the film is heated above this temperature, it will start to extend again. The heating under slight tension may be carried out by clamping the film at each end, applying a slight tension of about 1–5 p.s.i. thereto and then heating the film by forced hot air to the desired temperature for the required time. It is obvious to one skilled in the art that various other shrinking techniques may be employed, but this is the one preferred.

The following specific examples will further illustrate the applicability of the present heat-treating process to polycarbonates of aromatic diols in general, and will further demonstrate the unusual and unexpected elevation of heat-distortion temperatures of these polymers. In these examples, all films were of 1–2 mil. thickness, were cast from methylene chloride, and inherent viscosities were measured in chloroform. Heat-distortion temperatures at 5 p.s.i. were determined in the forced-convection oven referred to above.

Example 1

The film of a polycarbonate from 4,4'-isopropylidenediphenol (inherent viscosity 1.4) had a heat-distortion temperature at 5 p.s.i. of 151° C. (due to 2% shrinkage of the film). The second-order transition temperature was 149° C. The film was heated under slight tension (about 5 p.s.i.) to 152° C. and held at this temperature for 1 hour. During this time, the film continued to shrink until the total shrinkage was 9%. The film was then cooled, and the heat-distortion temperature at 5 p.s.i. was determined on a strip. Distortion was due to extension of the film, and 2% extension occurred at 191° C. The improvement in the heat-distortion temperature, therefore, was 40° C. An alternate method of shrinking the film was to heat it directly to 170° C. and hold it at this temperature for 1 minute (instead of at 152° C. for 1 hour). Total shrinkage was 9%. This film then had the same heat-distortion temperature, 191° C., as the first film.

Example 2

The film of a polycarbonate (inherent viscosity 0.9) prepared from phosgene and equimolar amounts of 4,4'-isopropylidenediphenol and 2,5- and 2,6-norbornanediol isomer mixture had a heat-distortion temperature at 5 p.s.i. of 190° C. It was heated under slight tension (about 2 p.s.i.) to 192° C. and held at this temperature for 30 minutes. Total film shrinkage was 8%. The heat-distortion temperature at 5 p.s.i. was then 225° C., an increase of 35° C.

Example 3

The film of a polycarbonate from 4,4'-(2-norbornylidene)diphenol (inherent viscosity 1.9) had a heat-distortion temperature at 5 p.s.i. of 227° C. The second-order transition temperature was 224° C. The film was rapidly heated under a tension of about 5 p.s.i. to 260° C. and held at this temperature for 30 seconds. The heat-distortion temperature at 5 p.s.i., determined on a film strip, was then 268° C., an increase of 41° C.

Example 4

The film of a polycarbonate from 4,4'-(2-norbornylmethylene)diphenol (inherent viscosity 0.5) had a heat-distortion temperature at 5 p.s.i. of 218° C. The second-order transition temperature was 207° C. The film was heated under a tension of about 4 p.s.i. to 225° C. and held at this temperature for 30 minutes. The heat-distortion temperature at 5 p.s.i. was then 252° C., an increase of 34° C.

Example 5

The film of a polycarbonate from 4,4'-(hexahydro-4,7-methanoindan-5-ylidene)diphenol (inherent viscosity 1.6) had a heat-distortion temperature at 5 p.s.i. of 260° C. The second-order transition temperature was 256° C. The film was heated to 280° C. and held at this temperature for 5 minutes. The heat-distortion temperature at 5 p.s.i. was then found to be 296° C., an increase of 36° C.

Example 6

A film of the polymer of Example 5 containing 20% by weight of Aroclor 1254 (a chlorinated biphenyl) containing 54% chlorine) had a heat-distortion temperature at 5 p.s.i. of 145° C. The film was heated to 160° C. and held at this temperature for 20 minutes. The heat-distortion temperature at 5 p.s.i. was then found to be 195° C., an increase of 50° C.

Example 7

The film of a polycarbonate (inherent viscosity 2.2) prepared from phosgene and a 5:1 molar ratio of 4,4'-(hexahydro - 4,7 - methanoindan-5-ylidene)diphenol and 4,4' - isopropylidenebis[2,6-dibromophenol] had a heat-distortion temperature at 5 p.s.i. of 273° C. The film was heated under a tension of about 5 p.s.i. to 295° C. and held at this temperature for 1 minute. The total film shrinkage was 10%. The heat-distortion temperature at 5 p.s.i. was then 298° C., an increase of 25° C.

Example 8

The film of a polycarbonate (inherent viscosity 0.8) prepared from phosgene and a 1:2 molar ratio of 5,6,7,8-tetrahydro-1,4-naphthalenediol and 4,4'-isopropylidenediphenol had a heat-distortion temperature at 5 p.s.i. of 152° C. Under a tension of about 5 p.s.i. the film was heated to 165° C. and held at this temperature for 30 minutes. By this treatment the heat-distortion temperature was increased 46° C. to 198° C.

Example 9

The partially crystalline film of a polycarbonate from 4,4'-isopropylidenediphenol (inherent viscosity 0.9) was obtained by casting from methylene chloride containing 20% anisole by volume. After all anisole was removed from the film by drying, the film could be heated to 177° C. before it had a distortion of ¼ percent at 5 p.s.i. The film was heated under a tension of about 5 p.s.i. to 220° C. and held at this temperature for 5 minutes. Total shrinkage of the film was 3%. After this treatment the film could be heated to 231° C. before it distorted ¼ percent at 5 p.s.i., an increase of 54° C.

The invention has been described in detail with particular reference to preferred embodiments thereof, but it will be understood that variations and modifications can be effected within the spirit and scope of the invention as described hereinabove and as defined in the appended claims.

We claim:
1. A process for substantially increasing the heat-distortion temperature of a polycarbonate article wherein the polycarbonate was prepared from at least about 50 mole percent of at least one aromatic diol, said process comprising heating said article to a temperature of at least about the second-order transition temperature of the polycarbonate, but not above a temperature at which maximum shrinkage of said article occurs for a sufficient time to cause substantial shrinkage of said article.

2. A process for substantially increasing the heat-distortion temperature of a polycarbonate fiber wherein the polycarbonate was prepared from at least about 50 mole percent of at least one aromatic diol, said process comprising heating said fiber to a temperature of at least about the second-order transition temperature of the polycarbonate, but not above a temperature at which maximum shrinkage of said fiber occurs for a sufficient time to cause substantial shrinkage of said fiber.

3. A process for substantially increasing the heat-distortion temperature of a polycarbonate film wherein the solid polycarbonate was prepared from a diol component at least about 50 mole percent of which consisted of at least one aromatic diol, said process comprising heating said film to a temperature of at least about the second-order transition temperature of the polycarbonate, but not above a temperature at which maximum shrinkage of the said film occurs for a sufficient time to cause substantial shrinkage of said film.

4. The process of claim 3 wherein the film is held under a slight tension during heating.

5. The process of claim 3 wherein the heating of the film is conducted at a previously determined temperature at which maximum shrinkage occurs.

6. The process of claim 3 wherein the heating of the film is conducted at a temperature which is only slightly above the second-order transition temperature of the said polycarbonate.

7. The process of claim 3 wherein the polycarbonate product has a heat distortion temperature of from about 25° to about 50° C. higher than the untreated product.

8. The process of claim 3 wherein the polycarbonate was prepared from 4,4'-isopropylidenediphenol.

9. The process of claim 3 wherein the polycarbonate was prepared from an equimolar mixture of 4,4'-isopropylidenediphenol and a norbornanediol.

10. The process of claim 3 wherein the polycarbonate was prepared from 4,4'-(2-norbornylidene)diphenol.

11. The process of claim 3 wherein the polycarbonate was prepared from 4,4'-(2-norbornylmethylene)diphenol.

12. The process of claim 3 wherein the polycarbonate was prepared from 4,4'-(hexahydro-4,7-methanoindan-5-ylidene)diphenol.

13. The process of claim 3 wherein the polycarbonate was prepared from a 5 to 1 molar ratio mixture of 4,4'-(hexahydro - 4,7-methanoindan-5-ylidene)diphenol and 4,4'-isopropylidene bis[2,6-dibromophenol].

14. The process of claim 3 wherein the polycarbonate was prepared from a 1 to 2 molar ratio mixture of 5,6,7,8-tetrahydro-1,4-naphthalenediol and 4,4'-isopropylidenediphenol.

15. A film of a polycarbonate prepared from 4,4'-isopropylidenediphenol and having a heat-distortion temperature of about 191° C. as measured by 2 percent film length change at 5 p.s.i.

16. A film of polycarbonate prepared from an equimolar mixture of 4,4'-isopropylidenediphenol and a norbornanediol and having a heat distortion temperature of about 225° C. as measured by 2 percent film length change at 5 p.s.i.

17. A film of a polycarbonate prepared from 4,4'-(2-norbornylidene)diphenol and having a heat-distortion temperature of about 268° C. as measured by 2 percent film length change at 5 p.s.i.

18. A film of a polycarbonate prepared from 4,4'-(2-norbornylmethylene)diphenol and having a heat-distortion temperature of about 252° C. as measured by 2 percent film length change at 5 p.s.i.

19. A film of a polycarbonate prepared from 4,4'-(hexahydro - 4,7-methanoindan-5-ylidene)diphenol and having a heat-distortion temperature of about 296° C. as measured by 2 percent film length change at 5 p.s.i.

20. A film of a polycarbonate prepared from a 5 to 1 molar ratio mixture of 4,4' - (hexahydro - 4,7 - methanoindan-5-ylidene)diphenol and 4,4'-isopropylidenebis [2,6-dibromophenol] and having a heat-distortion temperature of about 298° C. as measured by 2 percent film length change at 5 p.s.i.

21. A film of a polycarbonate prepared from a 1 to 2 molar ratio mixture of 5,6,7,8-tetrahydro-1,4-naphthalenediol and 4,4'-isopropylidenediphenol and having a heat-distortion temperature of about 198° C. as measured by 2 percent film length change at 5 p.s.i.

22. A polycarbonate article prepared from 4,4'-isopropylidenediphenol and having a heat-distortion temperature of about 191° C. as measured by a 2 percent change in length of film of the said polycarbonate at 5 p.s.i.

23. A polycarbonate article prepared from 4,4'-(2-norbornylidene)diphenol and having a heat-distortion temperature of about 268° C. as measured by a 2 percent change in length of film of the said polycarbonate at 5 p.s.i.

References Cited

UNITED STATES PATENTS

| | | | |
|---|---|---|---|
| 3,021,305 | 2/1962 | Goldberg | 260—47 |
| 3,213,060 | 10/1965 | Jackson et al. | 260—47 |

FOREIGN PATENTS 634,001  11/1963  Belgium.

OTHER REFERENCES

Christopher et al.: "Polycarbonates," Reinhold Publishing Corp., N.Y., 1962, pp. 96, 97, 102 and 103.

SAMUEL H. BLECH, *Primary Examiner.*